(12) United States Patent
Gaiser

(10) Patent No.: US 11,008,912 B2
(45) Date of Patent: May 18, 2021

(54) EXHAUST GAS HEATING ELEMENT

(71) Applicant: Eberspächer Exhaust Technology GmbH, Neunkirchen (DE)

(72) Inventor: Gerd Gaiser, Reutlingen (DE)

(73) Assignee: Eberspächer Exhaust Technology GmbH, Neunkirchen (DE)

( * ) Notice: Subject to any disclaimer, the term of this patent is extended or adjusted under 35 U.S.C. 154(b) by 0 days.

(21) Appl. No.: 16/820,247

(22) Filed: Mar. 16, 2020

(65) Prior Publication Data

US 2020/0300141 A1 Sep. 24, 2020

(30) Foreign Application Priority Data

Mar. 22, 2019 (DE) ...................... 10 2019 107 384.7

(51) Int. Cl.
*F01N 3/20* (2006.01)
*B01D 53/94* (2006.01)
(Continued)

(52) U.S. Cl.
CPC ....... *F01N 3/2013* (2013.01); *B01D 53/9454* (2013.01); *B01J 23/42* (2013.01); *B01J 23/44* (2013.01); *B01J 23/464* (2013.01); *B01J 29/061* (2013.01); *F01N 3/029* (2013.01); *F01N 3/0814* (2013.01); *F01N 3/0835* (2013.01); *F01N 3/2066* (2013.01); *F01N 3/28* (2013.01); *F01N 13/14* (2013.01); *B01D 2255/1021* (2013.01); *B01D 2255/1023* (2013.01);
(Continued)

(58) Field of Classification Search
CPC ...... F01N 3/2013; F01N 3/029; F01N 3/0814; F01N 3/0835; F01N 3/28; B01D 53/9454; B01J 23/42
USPC ......................................................... 422/174
See application file for complete search history.

(56) References Cited

U.S. PATENT DOCUMENTS 4,976,929 A * 12/1990 Cornelison ........... F01N 3/2026
422/174
5,474,746 A * 12/1995 Maus ....................... H05B 3/50
422/174

(Continued)

FOREIGN PATENT DOCUMENTS

DE 69614189 T2 1/2002
DE 202015103787 U1 9/2015
(Continued)

*Primary Examiner* — Tom P Duong
(74) *Attorney, Agent, or Firm* — McGlew and Tuttle, P.C.

(57) ABSTRACT

An exhaust gas heating unit for an exhaust system of an internal combustion engine includes a jacket heating conductor element (12) including a jacket (16) and with an electrical heating conductor (14), which extends in the jacket and is enclosed by insulating material (18). A heat transfer surface formation (20) is arranged on, and in heat transfer contact with, an outer side of the jacket. The heat transfer surface formation includes a heat transfer element with a meandering extent along the jacket heating conductor element with a plurality of heat transfer element sections (32), which pass over into one another in bent areas (30) and are arranged following one another in a longitudinal direction of the jacket heating conductor element. Each heat transfer element section in association with the jacket heating conductor element has a passage opening (34), through which the jacket heating conductor element passes.

22 Claims, 7 Drawing Sheets

(51) Int. Cl.
*B01J 23/42* (2006.01)
*B01J 23/44* (2006.01)
*B01J 23/46* (2006.01)
*B01J 29/06* (2006.01)
*F01N 3/029* (2006.01)
*F01N 3/08* (2006.01)
*F01N 3/28* (2006.01)
*F01N 13/14* (2010.01)

(52) U.S. Cl.
CPC ............... *B01D 2255/1025* (2013.01); *B01D 2255/20723* (2013.01); *B01D 2255/20738* (2013.01); *B01D 2255/20761* (2013.01); *B01D 2255/50* (2013.01); *F01N 2370/04* (2013.01); *F01N 2510/02* (2013.01); *F01N 2570/12* (2013.01); *F01N 2610/03* (2013.01); *F01N 2610/1453* (2013.01)

(56) References Cited

U.S. PATENT DOCUMENTS

| | | | | |
|---|---|---|---|---|
| 6,109,018 | A | * | 8/2000 | Rostrup-Nielsen ..... F01N 3/281 60/777 |
| 6,184,506 | B1 | * | 2/2001 | Shoji ....................... F01N 3/281 219/537 |
| 8,529,842 | B2 | * | 9/2013 | Bruck ...................... B01J 35/04 422/174 |
| 2010/0089036 | A1 | * | 4/2010 | Hodgson ............. B01D 53/9495 60/277 |
| 2017/0254244 | A1 | * | 9/2017 | Kurpejovic ........ B01D 46/0027 |
| 2017/0273146 | A1 | * | 9/2017 | Everly .................... H05B 3/16 |
| 2018/0119591 | A1 | | 5/2018 | Everly et al. |
| 2018/0291786 | A1 | | 10/2018 | Bartolo |

FOREIGN PATENT DOCUMENTS

| | | |
|---|---|---|
| DE | 102014115923 A1 | 5/2016 |
| DE | 102016107213 A1 | 9/2017 |
| WO | 2017/151975 A1 | 9/2017 |

* cited by examiner

EXHAUST GAS HEATING ELEMENT

CROSS REFERENCE TO RELATED APPLICATIONS

This application claims the benefit of priority under 35 U.S.C. § 119 of German Application 10 2019 107 384.7, filed Mar. 22, 2019, the entire contents of which are incorporated herein by reference.

TECHNICAL FIELD

The present invention pertains to an exhaust gas heating element for an exhaust system of an internal combustion engine.

TECHNICAL BACKGROUND

The increasingly strict requirements imposed on the pollutant emissions of internal combustion engines require special measures, which ensure that the pollutant emission can also be reduced during the cold start of an internal combustion engine when the components of an exhaust system are cold. During such a cold start, especially the catalytic converter units arranged in an exhaust system, for example, a three-way catalytic converter, an oxidation catalytic converter or an SCR catalytic converter, are at a temperature that is generally insufficient for carrying out the catalytic reaction to be carried out in them. To achieve more rapid heating of such catalytic converters and also of particle filters, for example, in diesel internal combustion engines, the fuel injection may take place later or in case of spark-ignition engines, the ignition angle can be set for a delay in order to counteract this problem, but this requires major changes in the engine management.

SUMMARY

An object of the present invention is to provide an exhaust gas heating unit for an exhaust system of an internal combustion engine, which makes possible an efficient heating of system areas of the exhaust system especially during a start phase of an internal combustion engine.

This object is accomplished according to the present invention by an exhaust gas heating unit for an exhaust system of an internal combustion engine, comprising:
at least one jacket heating conductor element with a jacket and with an electrical heating conductor, which extends in the jacket and is enclosed by insulating material, and
a heat transfer surface formation, which is arranged on an outer side of the jacket of the at least one jacket heating conductor element and is in heat transfer contact with same
wherein the heat transfer surface formation comprises at least one heat transfer element extending in a meandering manner (having a meandering extent) along the jacket heating conductor element with a plurality of heat transfer element sections, which pass over (transition) into one another in bent areas and are arranged following one another in the longitudinal direction of the jacket heating conductor element, wherein a passage opening, through which the at least one jacket heating conductor element passes, is formed in each heat transfer element section in association with the jacket heating conductor element in each heat transfer element section.

The interaction of the jacket heating conductor element with the heat transfer element receiving same with meandering, i.e., essentially zigzag-shaped or accordion-like structure leads to an exhaust gas heating element with a very large surface, which is available for heating exhaust gas flowing around same and thus guarantees an efficient heating in a comparatively small space and with a comparatively short flow length.

The jacket of the jacket heating conductor element may be made of a metallic material. Further, to obtain a stable exhaust gas heating unit, the heat transfer surface formation may be connected to the jacket in a frictionally engaged manner, preferably by pressing on or by shrinking on, or/and by connection in substance, preferably by welding or soldering.

Depending on the space available for installation in an exhaust system, the jacket heating conductor element may be configured such that it extends linearly at least in some areas or/and the at least one jacket heating conductor element may be configured such that it extends, in at least some areas, in a screw thread-like and/or helical manner (helically) or/and the jacket heating conductor element may be configured such that it extends in a meandering manner (has a meandering extent) in at least some areas.

It is proposed for a uniform incoming flow characteristic of the heat transfer surfaces formed at the exhaust gas heating unit or at the heat transfer element that at least some and preferably all heat transfer element sections be arranged essentially parallel to one another or/and be arranged essentially at right angles to the longitudinal direction of the jacket heating conductor element.

Especially if a structure with a wound, i.e., non-linearly extending jacket heating conductor element shall be provided, it is proposed that at least some and preferably all heat transfer element sections be oriented at an angle different from 90° in relation to the longitudinal direction of the jacket heating conductor element.

Such a structure may be obtained, for example, by at least two and preferably all heat transfer element sections directly adjacent to one another in the longitudinal direction of the jacket heating conductor element being arranged in an essentially V-shaped manner (with a V-shape) in relation to one another, or/and by at least one and preferably each heat transfer element section being arranged essentially parallel to the heat transfer element section located at the heat transfer element section after next in the longitudinal direction of the jacket heating conductor element.

Provisions may be made in an alternative embodiment for at least one and preferably each heat transfer element section to be arranged essentially parallel to a heat transfer element section located directly adjacent on a first side thereof in the longitudinal direction of the jacket heating conductor element and to be arranged in an essentially V-shaped manner with a heat transfer element section located directly adjacent on a second side thereof, which side is located opposite the first side, in the longitudinal direction of the jacket heating conductor element.

It is proposed for a stable holding of the heat transfer element at the jacket heating conductor element and for a good heat transfer between these that a collar, which encloses the passage opening formed in the heat transfer element section, projects from the heat transfer element section and is in contact with the jacket heating conductor element, be provided at at least one and preferably each heat transfer element section.

For a compact configuration and in case of a good flow around the heat transfer element, it is proposed that at least some and preferably all heat transfer element sections between the bent areas defining these heat transfer element sections, have the same length of extension, or/and that at least some and preferably all heat transfer element sections be essentially unbent.

In an especially advantageous variant of the exhaust gas heating unit according to the present invention, a heat transfer surface of the heat transfer surface formation may be provided with catalytically active material in at least some sections. The exhaust gas heating unit is thus used not only for heating, but is also used to utilize the heat provided in it directly for carrying out a catalytic reaction.

It is advantageous for a stable connection of such a coating to a heat transfer element if the at least one heat transfer element is formed with an aluminum material, preferably an aluminum alloy, e.g., FeCr alloy 1.4767.

Especially if the exhaust gas heating unit shall act as a three-way catalytic converter or as a diesel oxidation catalytic converter, the catalytically active material may comprise:
platinum, or/and
palladium, or/and
rhodium.

If the exhaust gas heating unit shall act as an SCR catalytic converter, the catalytically active material may comprise:
iron zeolite material, or/and
copper zeolite material, or/and
vanadium oxide material.

The present invention further pertains to a process for manufacturing an exhaust gas heating unit according to the present invention, comprising the steps of
a) Providing a strip-line blank for the heat transfer element,
b) alternatingly bending the strip-like blank in mutually opposite bending directions to provide the bent areas at spaced locations from one another in a longitudinal direction of the strip-like blank and for providing the heat transfer element sections extending between the bent areas,
c) introducing a plurality of passage openings following one another in the longitudinal direction of the strip-like blank before, after or during step b), and
d) inserting the at least one jacket heating conductor element into the passage openings arranged directed towards one another after step c).

With such a process, a heat transfer element, which may be arranged such that it encloses or accommodates a jacket heating conductor element with its meandering, i.e., zigzag-like or accordion-like structure, can be provided from a strip-like blank, which is made generally of a metallic material or sheet metal material, and may be rolled up into a coil, in an especially simple manner.

The collar enclosing the passage opening may be formed in association with at least one and preferably each passage opening for a further simplification of such a manufacturing process in step c).

In order to ensure that all collars are oriented in the same direction in the meandering structure, it is further proposed that in step c), the collars be formed projecting on mutually opposite sides of the strip-like blank in passage openings following one another directly in the longitudinal direction of the strip-like blank.

In order to make it possible to provide the connection between the heat transfer element and the jacket heating conductor element in a simple manner, it is proposed that before or during step d), the heat transfer element sections be held, overlapping one another, at a mutual jacket heating conductor element insertion distance in relation to one another, so that the passage openings formed therein are oriented towards one another, after which the jacket heating conductor element is passed through the passage openings and the heat transfer element sections are then released and assume mutually spaced locations from one another, said distance being greater than the jacket heating conductor element insertion distance.

The present invention further pertains to an exhaust system for an internal combustion engine, comprising at least one exhaust gas heating element, which is configured according to the present invention, is arranged in an exhaust gas flow duct and can be preferably manufactured with the process according to the present invention.

To make it possible to efficiently utilize in the exhaust system the heat provided in the exhaust gas heating unit and transferred to the exhaust gas, the exhaust gas heating element is preferably arranged in an exhaust gas flow direction in the exhaust gas flow duct upstream in relation to an exhaust gas treatment unit, especially catalytic converter unit or particle filter unit.

Especially if the exhaust gas heating unit itself is configured such that it is catalytically active, it is advantageous if the catalytically active material and the catalytic converter unit are associated with the same type of catalytic converter. This means that if, for example, the exhaust gas heating unit shall act as a three-way catalytic converter and is coated or configured for this reason with a corresponding catalytically active material, the catalytic converter unit arranged downstream therefrom is also of the type of the three-way catalytic converter. Thus, the exhaust gas heating unit heated very rapidly by the jacket heating conductor element, for example, during a start phase, can also act as a catalytic converter, even if the three-way catalytic converter then following downstream is not yet catalytically active due to an excessively low temperature.

It is proposed for an even more rapid heating of the exhaust system that a hydrocarbon releasing device be associated at least with an exhaust gas heating unit for releasing hydrocarbon into the exhaust gas stream upstream in relation to the exhaust gas heating unit. The hydrocarbon, i.e., for example, gasoline or diesel fuel, reacting on the hot surface of the exhaust gas heating unit, releases a considerable amount of heat during its reaction, and this heat heats in the area surrounding the exhaust gas heating unit the exhaust gas flowing there and thus supports an efficient heating of system areas located farther downstream.

The present invention will be described below in detail with reference to the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF PREFERRED EMBODIMENTS

Figure 1:
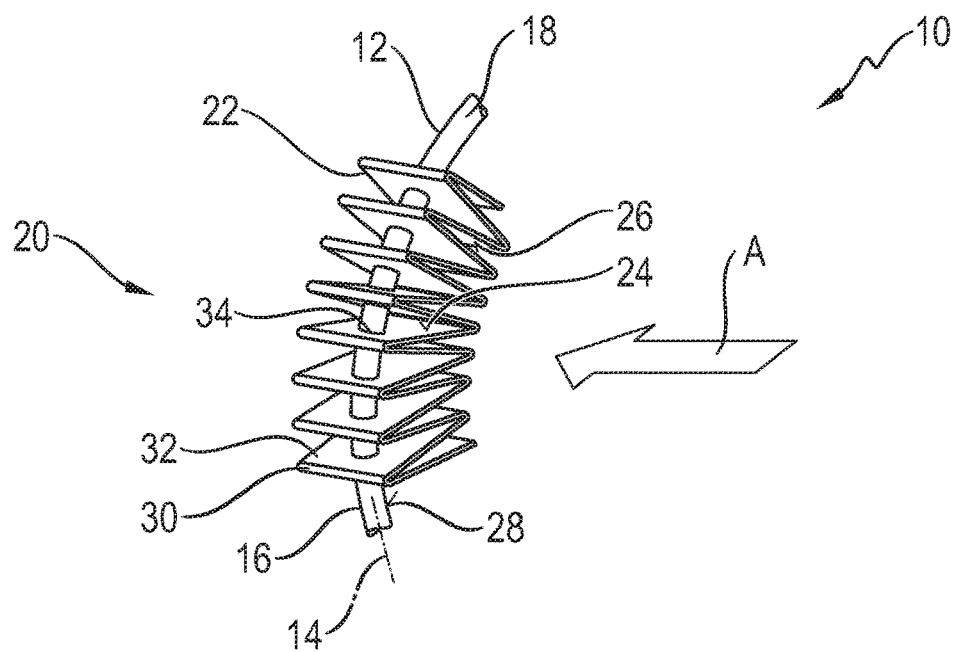
FIG. 1 is a perspective view showing a section of an exhaust gas heating unit comprising a high-temperature-capable jacket heating conductor element.

Referring to the drawings, FIG. 1 shows an exhaust gas heating unit 10 for an exhaust system of an internal combustion engine. The exhaust gas heating unit 10 comprises an especially high temperature-capable jacket heating conductor element 12 with a heating conductor 14 arranged in a core area thereof. The heating conductor 14 may comprise one or more heating wires and is enclosed by an insulating material 18, for example, a ceramic material, in an interior space enclosed by a jacket 16.

A heat transfer surface formation 20 is arranged at an outer surface 28 of the jacket 16 made with a metallic material, for example, steel material. In the exemplary embodiment shown, the heat transfer surface formation 20 comprises a heat transfer element 22 extending in a meandering manner (having a meandering extent) along the jacket heat conductor element 12 and connected to the outer surface thereof 28. On both sides oriented essentially in the direction of the longitudinal extension of the jacket heating conductor element 12, the heat transfer element 22 provides heat transfer surfaces 24, 26, around which exhaust gas flowing in an exhaust gas flow direction A towards the exhaust gas heating unit 10 can flow and at which the heat absorbed by the jacket 16 can be transferred to the exhaust gas. Heat transfer also takes place, of course, to the exhaust gas flowing around the area of the outer surface 28 of the jacket 16 in the area of the outer surface 28 of the jacket 16.

As will be described in detail below, the heat transfer element 22 is made, for example, of a strip-like blank consisting of a metallic material and bent to a meandering, i.e., zigzag-like or accordion-like structure. Preferably essentially unbent heat transfer element sections 32 extend between bent areas 30 following each other. The heat transfer element sections 32 extending between two respective bent areas 30 preferably have equal length of extension between the bent areas 30 that end these sections 32. The heat transfer element sections 32 may be arranged approximately parallel or following one another at an angle and have, in association with the jacket heating conductor element 12, a respective passage opening 34, through which the jacket heating conductor element 12 extends and in the area of which a connection is established between the jacket heating conductor element 12 and the heat transfer element 22 or the heat transfer element sections 32 thereof. This connection may be established, for example, by connection in substance, i.e., for example, by soldering or welding, or it may be provided by clamping or press fit or shrinking on. The shrinking on may be brought about, for example, by the heat transfer element 22 being heated prior to the insertion of the jacket heating conductor element 12 into the passage openings 34 and then cooled. As an alternative, the heat transfer element may be made with shape memory material, which contracts after forming the passage openings 34 and on heating, so that the heat transfer element 22 will also contract in the area of the passage openings 34 and thus forms a firm connection to the jacket heating conductor element 12 after insertion of the jacket heating conductor element 12 into the passage openings 34 and especially during heating by exhaust gas flowing around the exhaust gas heating unit 10.

Figure 2:
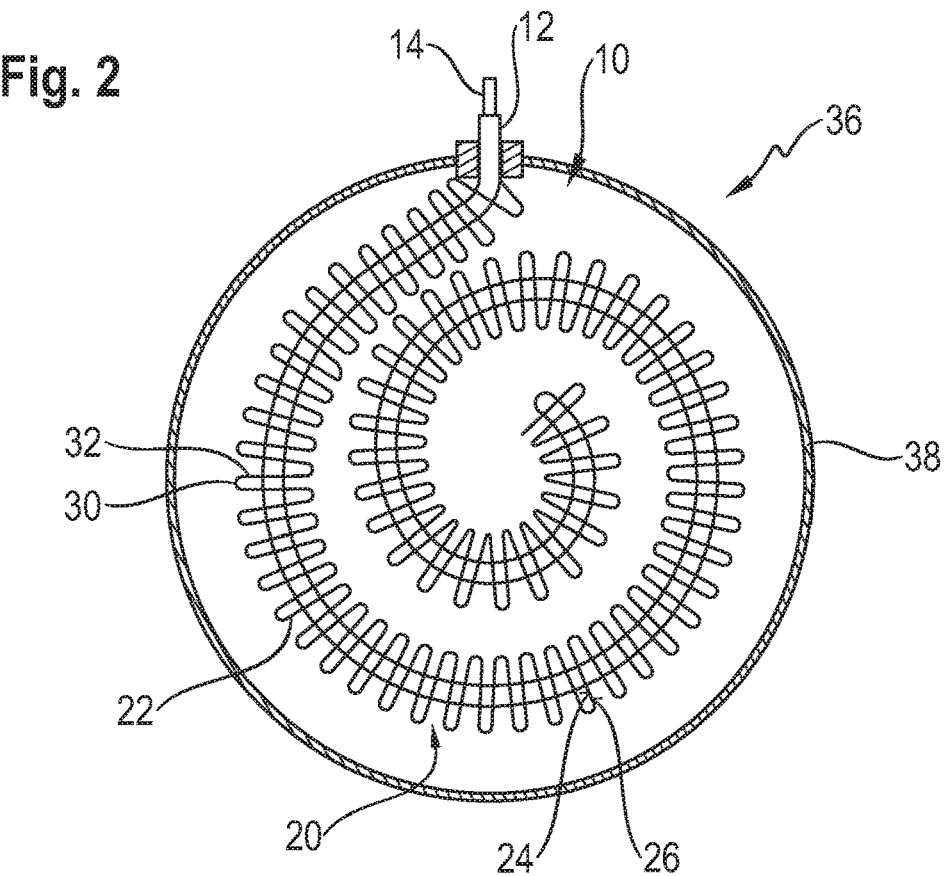
FIG. 2 is a sectional view showing the exhaust gas heating unit according to FIG. 1 in an exhaust system viewed in the exhaust gas flow direction.

FIG. 2 shows the arrangement of the exhaust gas heating unit 10 in an exhaust gas flow duct of an exhaust system 36. The exhaust system 36 has a tubular housing 38, in which the exhaust gas heating unit 10 is arranged, for example, upstream in relation to a catalytic converter unit acting as an exhaust gas treatment unit, and around which housing 38 the exhaust gas stream oriented at right angles to the drawing plane of FIG. 2 can flow. The exhaust gas heating unit 10 is wound spirally in the view shown in FIG. 2, so that essentially the entire cross section of the tubular housing 38 is lined with the exhaust gas heating unit 10. As an alternative or in addition, the exhaust gas heating unit 10 may be wound helically, so that an extension elongated in the exhaust gas flow direction is achieved as well. Depending on the cross-sectional geometry of the housing 38, the exhaust gas heating unit 10 may also be arranged with a meandering arrangement of the jacket heating conductor element, 12, i.e., with an arrangement extending essentially to and fro, in the interior of the housing 38.

Figure 3:
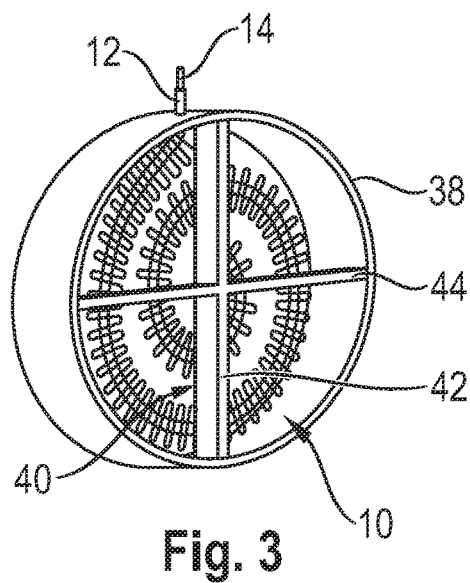
FIG. 3 is a perspective view corresponding to the view of FIG. 2.

A holding element 40 arranged in association with the exhaust gas heating unit 10 arranged in the housing 38 can be seen in FIG. 3. This holding element 40 has two holding bars 42, 44, which are made, for example, of a sheet metal material and which are arranged in a cross-like structure and are bent over in their end areas adjoining the housing 38 and are connected, for example, by connection in substance to the housing 38. The holding bars 42, 44 have a markedly greater extension in the exhaust gas flow direction than at right angles thereto, so that they can exert a stable holding action for the exhaust gas heating unit 10, on the one hand, but do not introduce any essential flow resistance for the exhaust gas, on the other hand. The bent end areas of the holding bars 42, 44 lead, furthermore, to the possibility that these can expand and contract under thermal load without the development of major stresses. To support this even more, the holding bars 42, 44 may also have a curved extension deviating from the linear extension shown.

Figure 4:
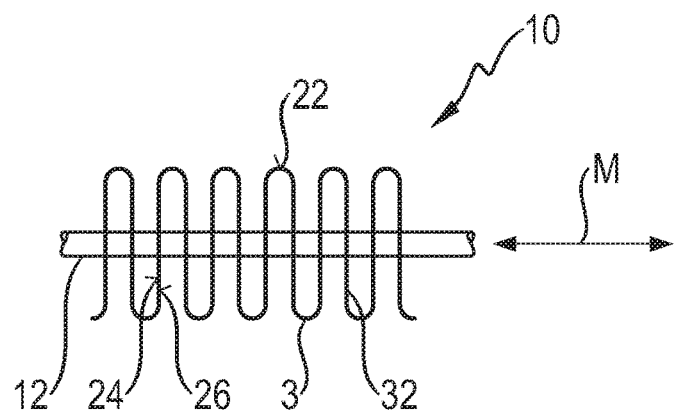
FIG. 4 is a side view of an exhaust gas heating element.
Figure 5:
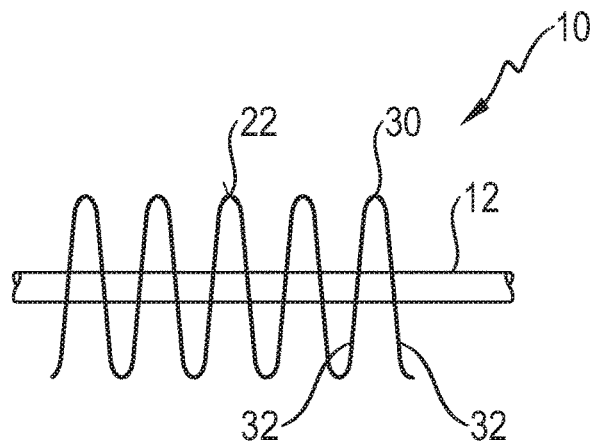
FIG. 5 is another side view of an exhaust gas heating element.
Figure 6:
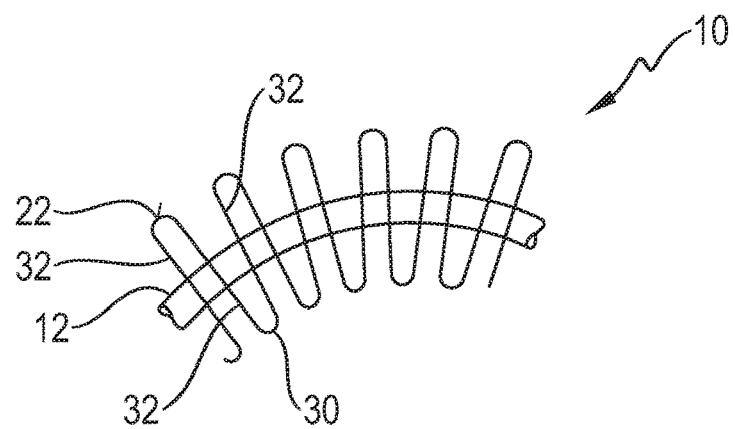
FIG. 6 is another side view of an exhaust gas heating element.

FIGS. 4-6 show different configurations of the heat transfer element 22 bent in a meandering shape. FIG. 4 shows an arrangement in which heat transfer element sections 32 extending between the bent areas 30 following one another are arranged essentially parallel in relation to one another. In case of the jacket heating conductor element 12 extending essentially linearly in a longitudinal direction, the heat transfer surfaces 24, 26 formed on both sides of the heat transfer element 32 are thus located opposite each other at essentially uniformly spaced locations, so that a good possibility is guaranteed for the flow through the exhaust gas heating unit 10.

FIG. 5 shows an embodiment in which the heat transfer element sections 32 are not arranged in parallel in relation to one another, but heat transfer element sections 32 following one another and adjoining one another in a bent area 30 provide a V-shaped structure, i.e., an essentially triangular structure. If, as is shown in FIG. 5, the jacket heating conductor element 12 is also arranged such that it also extends at first linearly, the bending of the jacket heating conductor element 12, for example, into the helical structure that can be seen in FIG. 2, leads to the heat transfer element sections 32 being brought closer to one another and, for example, again into a configuration in which they are essentially parallel to one another.

The structure shown in FIG. 5 with heat transfer element sections 32 arranged in a V-shaped manner in relation to one another can be obtained by the heat transfer element 22 bent in a meandering manner being at first compressed and by the passage openings 34 formed in the heat transfer element sections 32 being aligned with one another. The jacket heating conductor element 12 is then pushed through these passage openings 34. The heat transfer element 22 is then released or pulled out, so that the heat transfer element sections 32 will tilt in relation to the jacket heating conductor element 12 or tilt to a greater extent and assume the position in space shown in FIG. 5 in relation to the jacket heating conductor element 12, in which position they are arranged at an angle different from 90° rather than at right angles to this jacket heating conductor element 12. A clamping effect is brought about in the area of the passage openings 34 by this tilting of the heat transfer element sections 32 in relation to the jacket heating conductor element 12. This increases the strength of the connection and also improves the heat transfer contact.

FIG. 6 shows a configuration in which the heat transfer element sections 32 are arranged alternatingly parallel to one another and form a V-shaped structure. This means that each heat transfer element section 32 is located in parallel to a directly following heat transfer element section 32 arranged on one side thereof and forms a V-shaped structure with a directly following heat transfer element section 32 arranged on the other side thereof. Such an asymmetric configuration may be used, for example, when, as is shown in FIG. 6, the jacket heating conductor element 12 has a curved course.

Figure 7:
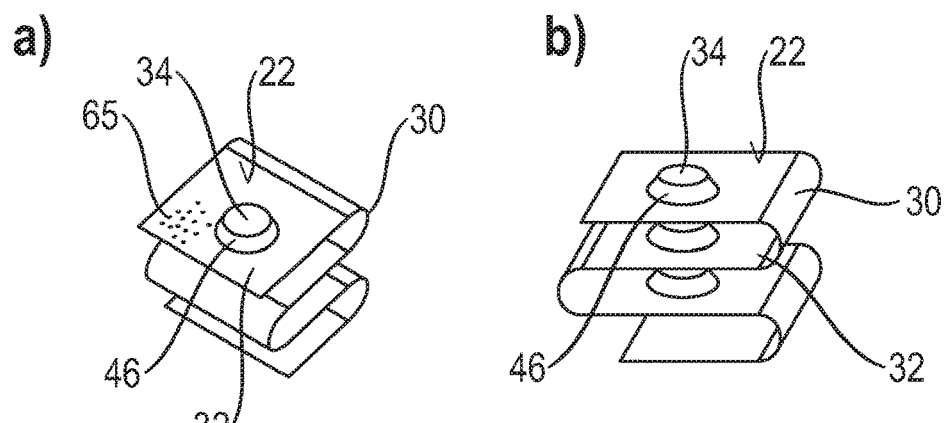
FIG. 7 is different perspective views a) and b) of a heat transfer element.
Figure 8:
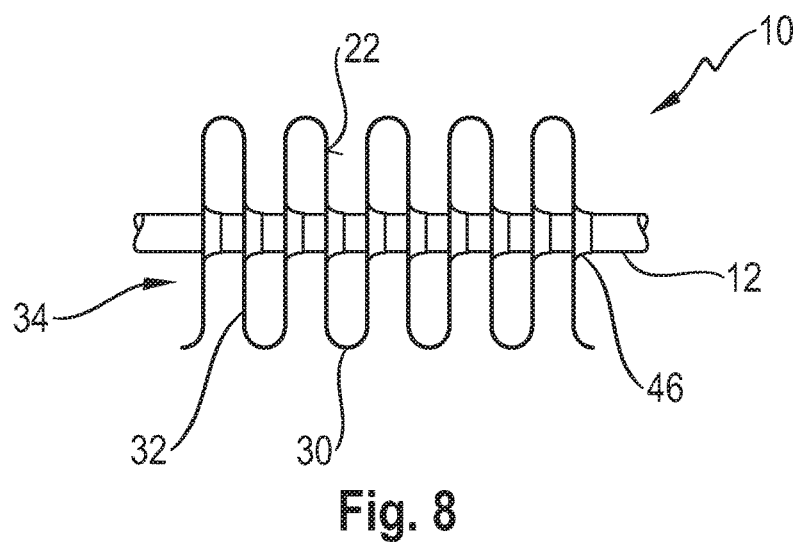
FIG. 8 is a side view of the heat transfer element according to FIG. 7 arranged at a jacket heating conductor element.
Figure 9:
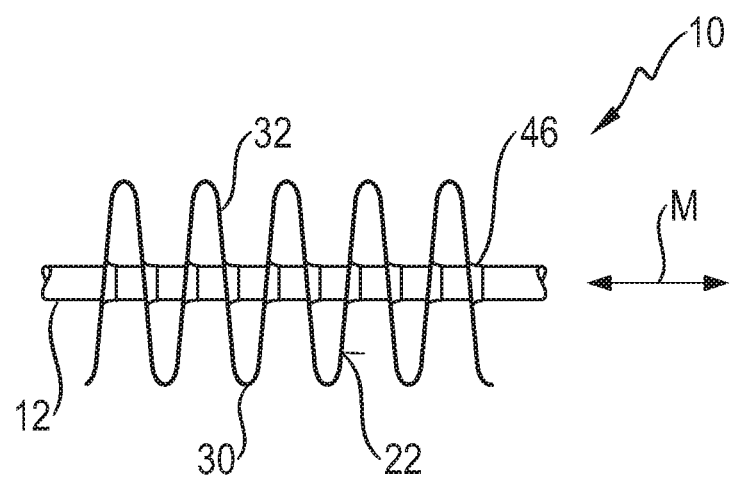
FIG. 9 is a side view showing the heat transfer element according to FIG. 7, which is arranged at a jacket heating conductor element.

FIGS. 7-9 show a special embodiment of a heat transfer element 22 in respect to the passage openings 34 provided therein. It is seen that a collar 46 provided, for example, as a flanged hole and enclosing a respective passage opening 34 is formed in each heat transfer element section 32. In case of a heat transfer element 22 arranged in a meandering structure, all collars 46 point in the same direction, so that each such collar 46 acts as an insertion funnel for the insertion of the jacket heating conductor element 12 into the passage openings 34. Further, an improved heat transfer contact can be provided between the jacket heating conductor element 12 and the heat transfer element 22 by the provision of the collars 46. The heat transfer element 22 can then also be connected permanently to the jacket heating conductor element 12, for example, by connection in substance, in the area of the collars 46.

It is also possible in case of a configuration with such collars 46 to arrange the heat transfer element sections 32 such that they are oriented essentially parallel to one another and hence essentially at right angles to the jacket heating conductor element 12, as this is illustrated in FIG. 8, or, as is shown in FIG. 9, also bent at an angle in relation to one another and also in the longitudinal direction M of the jacket heating conductor element 12 in order to form the V-shaped structure with heat transfer element sections 32 located directly adjacent to one another. This can also be achieved by a heat transfer element 22, which is maintained at first under a stronger compression, is released or pulled apart after insertion of the jacket heating conductor element 12 into the passage openings 34 and the individual heat transfer element sections 32 will tilt in the process in relation to one another and also in relation to the jacket heating conductor element 12.

It will be described below with reference to FIGS. 10-15 how such an exhaust gas heating unit 10 or the heat transfer element 22 therefor can be manufactured.

Figure 10:
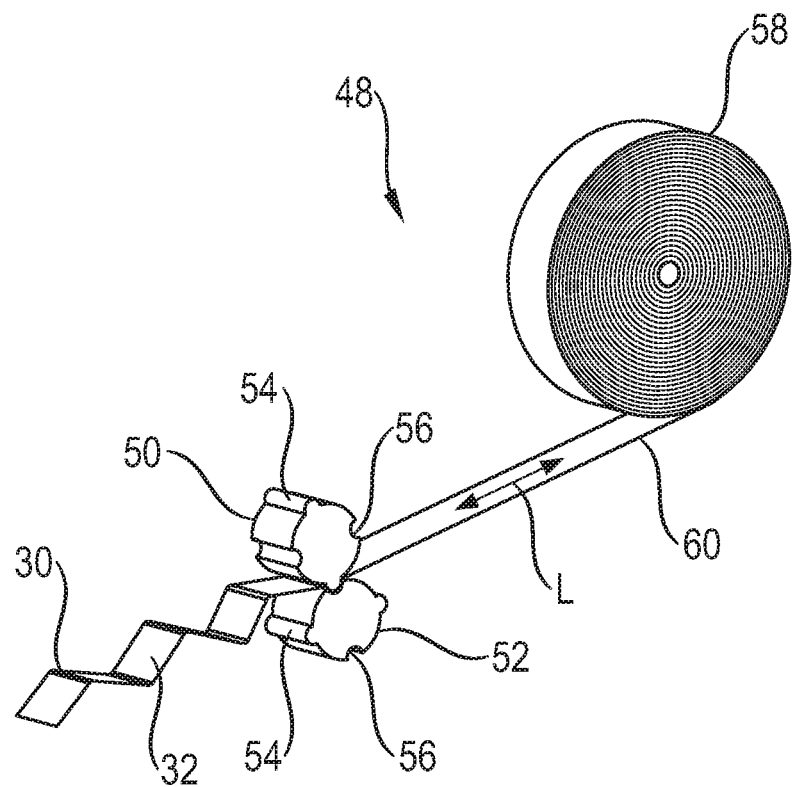
FIG. 10 is a general perspective view showing a device for manufacturing a heat transfer element.

As is illustrated in FIG. 10, a device 48 with shaping rollers 50, 52 rotating in opposite directions about mutually parallel axes may be used for this. The shaping rollers 50, 52 have on their outer circumference alternatingly a bending projection 54 extending in the direction of the axis of rotation and a bending recess 56. The two shaping rollers 50, 52 are positioned and pressed against one another with their outer circumferential areas such that the alternatingly arranged bending projections 54 and bending recesses 56 mesh with one another in the course of the rotation. A strip-like blank 60 being unwound from a coil 58 is thus deformed during the rotation of the shaping rollers 50, 52 for the heat transfer element 22 alternatingly in mutually opposite directions, as a result of which the bent areas 30 and the heat transfer element sections 32 located between them are formed.

Figure 12:
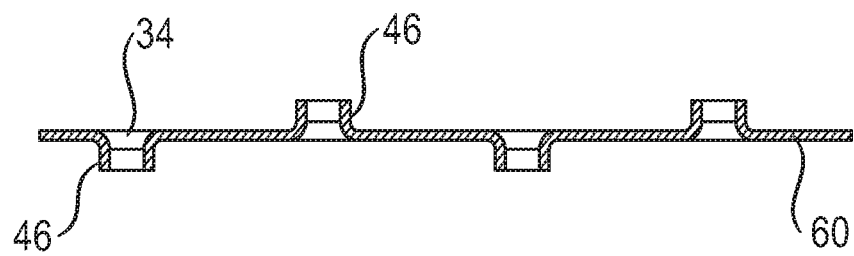
FIG. 12 is a sectional view showing a phase of the manufacture of a heat transfer element.

FIG. 12 shows that, for example, the passage openings 34 and the collars 46 can be prepared on the blank 60 after winding off from the coil 58 and before preparing the bent areas 30, i.e., in front of the two shaping rollers 50, 52. The shaping tools, which prepare, on the one hand, the passage openings 34 and form, on the other hand, the collars 46 projecting alternatingly towards different sides, for example, by embossing or drawing, can be used for this. In order to avoid a mutual interference of the collars 46 with the shaping rollers 50, 52, these may have depressions, with which the collars 46 already formed on the blank 60 can mesh during the movement between the shaping rollers 50, 52, for example, between bending projections 54 and bending recesses 56 following one another in the circumferential direction.

Figure 11:
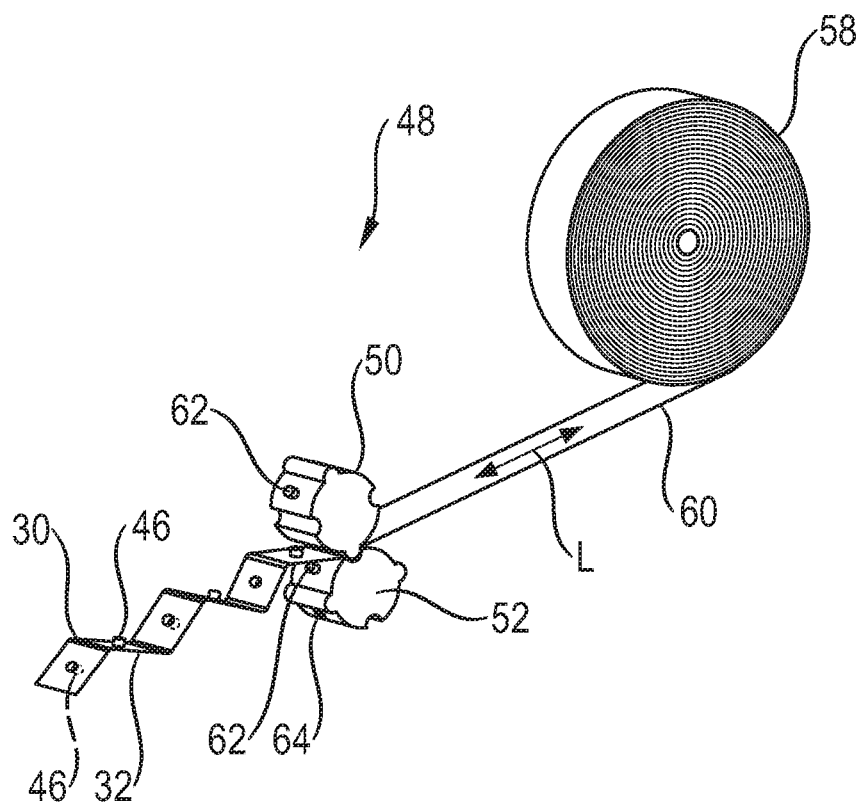
FIG. 11 is a general perspective view showing an alternative embodiment of a device for manufacturing a heat transfer element.

In an alternative embodiment of the device 48, which is shown in FIG. 11, respective collar projections 62 and collar recesses 64, which produce a passage opening 34 and a collar 46, respectively, during the passage of the blank 60 between the two shaping rollers 50, 52 essentially simultaneously with the formation of the bent areas 30 or shortly before the formation of a bent area 30, may be formed on the shaping rollers 50, 52 alternatingly between the bending projections 54 and bending recesses 56 following each other in the circumferential direction.

Figure 13:
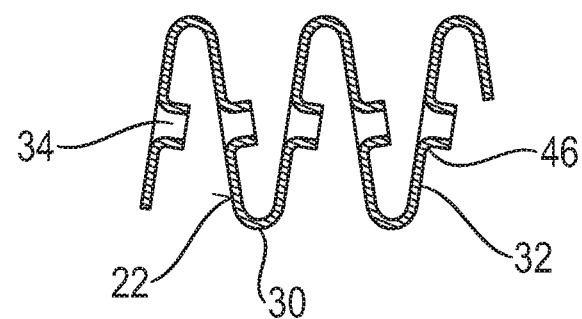
FIG. 13 is a sectional view showing another phase of the manufacture of a heat transfer element.
Figure 14:
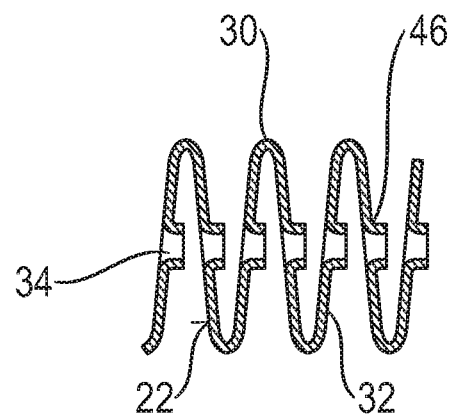
FIG. 14 is a sectional view showing another phase of the manufacture of a heat transfer element.
Figure 15:
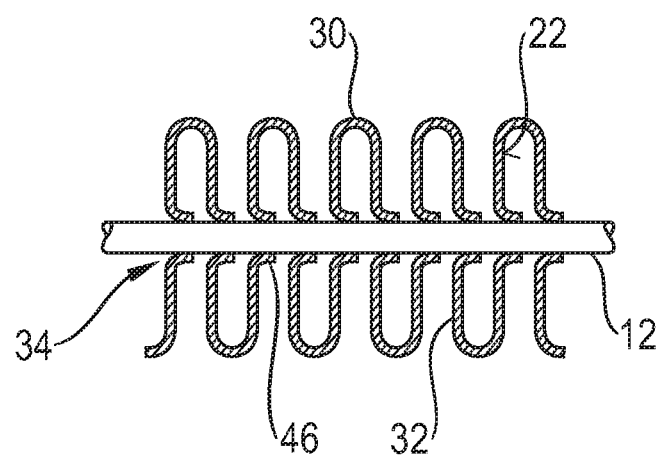
FIG. 15 is a sectional view showing the heat transfer element arranged at a jacket heating conductor element.

After the bent areas 30 and the collars 46 and the passage openings 34 enclosed by these have been produced in the blank 60, the blank 60 can be folded further to provide the heat transfer elements 22 formed with the meander-like structure, i.e., it may be bent further in the bent areas 30, so that the configuration shown in FIGS. 13 and 14 is obtained. The jacket heating conductor element 12 can then be passed through the passage openings 34, which are aligned with one another. To make it possible to obtain this orientation of all passage openings 34 in a simple manner during the bending or folding of the blank 60, it is advantageous if these are formed essentially centrally between two bent areas 30 in the longitudinal direction L of the blank 60. After the jacket heating conductor element 12 has been passed through the passage openings 34, as is illustrated in FIG. 15, the above-mentioned permanent connection can be generated, for example, by soldering the heat transfer element 22 to the jacket heating conductor element 12 in the area of the collars 46.

In another working step, the heat transfer element 22 may be coated with catalytically active material 65 in at least some areas on its outer surface, around which exhaust gas can flow. It is advantageous for a stable bonding of such catalytically active material 65 to provide such a heat transfer element 22 consisting of aluminum or an aluminum alloy containing a high percentage of aluminum. When applying such catalytically active material 65, the metallic surface is usually coated first with a porous ceramic oxide coating with a large inner surface, which coating is called a washcoat. The catalytically active material 65 is then applied to this coating, for example, in a so-called impregnation process. This process of applying catalytically active material 65 may be carried out, for example, during the preparation of the blank 60, so that a blank 60 already coated with catalytically active material is subjected to the above-described shaping process. It is possible, as an alternative, to coat every individual heat transfer element 22 bent to the meandering or zigzag-like structure with such a material 65.

The application of catalytically active material 65 to a heat transfer element 22 leads to the possibility of bringing the heat transfer element 22 or the catalytically active coating very rapidly to a temperature at which the catalytic reaction can take place while exhaust gas is flowing around when the jacket heating conductor element 12 connected to said catalytically active material is energized. This makes it possible to provide a catalytic action in the exhaust system almost without a time delay even during the start phase of an internal combustion engine and thus also to lower markedly the pollutant emission immediately after starting an internal combustion engine.

The catalytically active material 65 is selected depending on the particular type of the catalytic converter action to be provided. If, for example, the exhaust gas heating unit 10 shall act as a three-way catalytic converter, the catalytically active material 65 may contain platinum, palladium, rhodium or mixtures thereof. Structure-forming promoters improving the temperature stability of the catalytically active material 65 may also be provided in this coating. If the action of a diesel oxidation catalytic converter shall be achieved, it is advantageous to use platinum and palladium as principal components of the catalytically active material 65. Mixed oxides may be used as well. If the action of an SCR catalytic converter shall be achieved, it is advantageous to provide the catalytically active material 65 in the form of iron zeolite material, copper zeolite material or vanadium oxide material, e.g., vanadium pentoxide.

Figure 16:
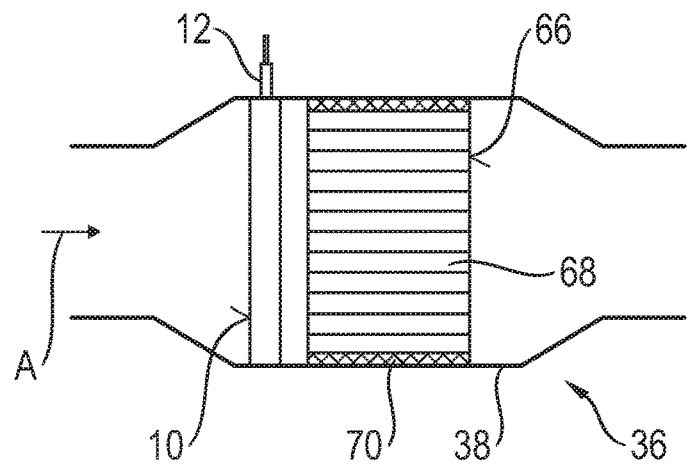
FIG. 16 is a sectional view showing an exhaust system with an exhaust gas heating unit arranged in an exhaust gas pipe upstream in relation to a catalytic converter unit.

This catalytic converter action can then be utilized in an especially efficient manner if, as this is illustrated in FIG. 16, such an exhaust gas heating unit 10 provided with catalytically active material 65 is arranged, for example, in the housing 38 arranged upstream in relation to a catalytic converter unit 66, which is arranged therein and acts as an exhaust gas treatment unit. It should be noted that in the usual configuration, the catalytic converter unit 66 may have a monolith 68, which is made of or coated with catalytically active material and which may be held in the housing 38 by a fiber material enclosing same.

If the exhaust gas heating unit 10 or its heat transfer element 22 is coated with catalytically active material 65, provisions are preferably made for the catalytically active material 65 provided on the exhaust gas heating unit 10 and for the catalytic converter unit 66 to provide the same type of a catalytic reaction. Thus, the exhaust gas heating unit 10 with the catalytically active material 65 provided on it can be brought to the temperature necessary for carrying out the catalytic reaction and thus it can become active as a catalytic converter very rapidly by means of electrical energization during a start phase, i.e., immediately after starting an internal combustion engine, even before the catalytic converter unit 66 reaches the temperature necessary for this. The catalytic converter unit 66 is heated by the exhaust gas, which is also discharged by the internal combustion engine during the start phase, on the one hand, and, on the other hand, by the exhaust gas flowing around the exhaust gas heating unit 10, and it is thus brought likewise rapidly to a sufficiently high temperature in order to carry out the catalytic reaction in this catalytic converter unit 66 as well. Once this temperature has been reached, the energization of the jacket heating conductor element 12 of the exhaust gas heating unit 10 can be ended. This may be recognized either by providing a temperature signal, or a defined time period may be provided, over which the exhaust gas heating unit 10 is energized during the start phase of the internal combustion engine.

Figure 17:
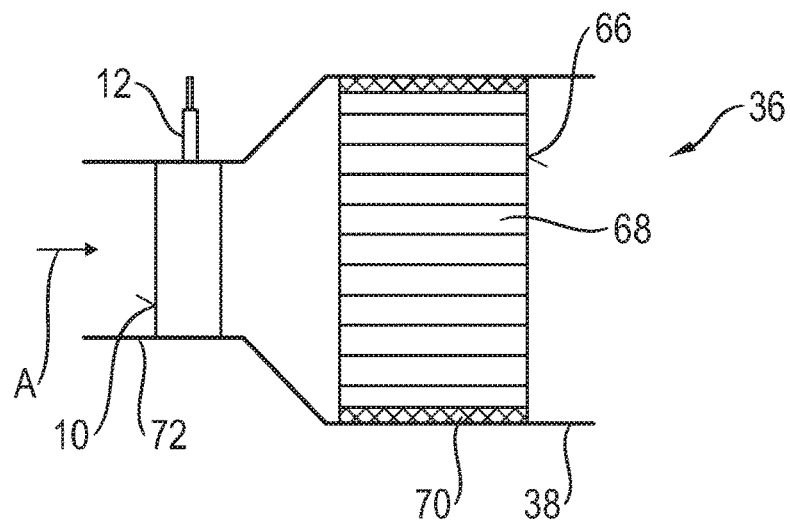
FIG. 17 is a sectional view showing another embodiment of an exhaust system with an exhaust gas heating unit arranged in an exhaust gas pipe upstream in relation to a catalytic converter unit.

FIG. 17 shows an embodiment in which the exhaust gas heating unit 10 is not accommodated, upstream in relation to the catalytic converter unit 66, in the housing 38 but in an exhaust gas pipe 72 adjoining at the upstream end thereof. Such an arrangement may be advantageous, for example, when the exhaust gas heating unit 10 shall have an elongated configuration.

Figure 18:
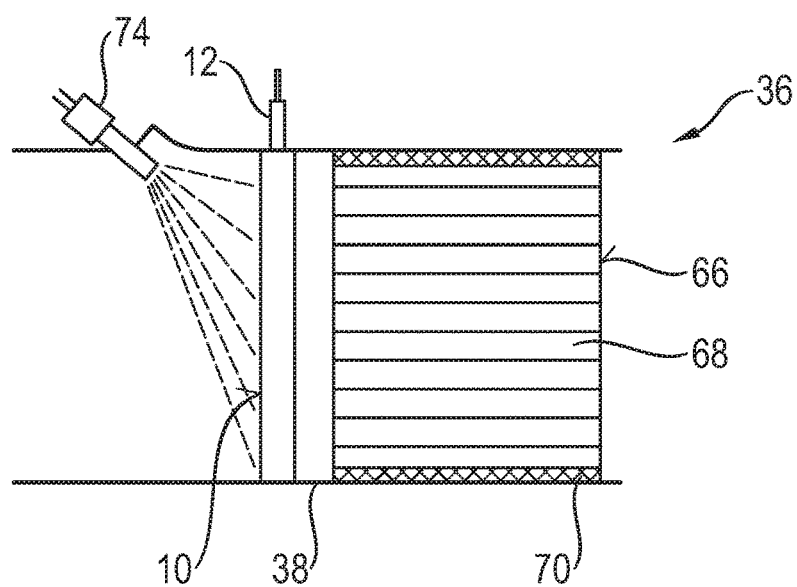
FIG. 18 is a sectional view showing an exhaust gas heating unit with a hydrocarbon releasing device associated therewith.

FIG. 18 shows an exhaust system 36, in which a hydrocarbon release device 74 is provided in association with the exhaust gas heating unit 10, which is, for example, likewise provided with catalytically active material 65. In the manner of an injector, this can inject hydrocarbon, i.e., for example, the fuel also used to operate the internal combustion engine, in the direction of the exhaust gas heating unit 10 into the exhaust gas stream. The hydrocarbon reacts on the hot surface of the exhaust gas heating unit 10, so that the reaction of the hydrocarbon releases heat of reaction, which can be additionally transferred to the exhaust gas flowing in the direction of the catalytic converter unit 6 then following downstream. Such a configuration is especially advantageous when the catalytic converter unit 66 is configured as an SCR catalytic converter, at which catalytic converter unit 66 a selective catalytic reduction is carried out while reacting the reducing agent, i.e., for example, a urea/water solution, which is injected by a reducing agent release device, not shown. A particle filter used as an exhaust gas treatment unit may also be regenerated by the injection of hydrocarbon independently from the operation of the internal combustion engine.

In another embodiment, hydrocarbon being transported in the exhaust gas stream may also be provided by this being discharged specifically by the internal combustion engine. It can be ensured for this purpose, for example, by a corresponding setting of the ignition angle or by a delayed fuel injection that only a portion of the fuel will be ignited during the combustion taking place in the internal combustion engine, while a portion of the fuel will be discharged unburned and will be available for the reaction taking plane at the exhaust gas heating unit 10 or/and at the exhaust gas treatment unit.

It should finally be noted that an exhaust gas treatment unit, in which a single jacket heating conductor element passes through passage openings associated with same in the heat transfer element sections of a heat transfer element, was described above in different configurations. A plurality of jacket heating conductor elements, for example, two jacket heating conductor elements, may, of course, also be provided in connection with a single heat transfer element in such an exhaust gas treatment unit. A respective passage opening provided for receiving a jacket heating conductor element may be formed in such a configuration in each of the heat transfer element sections in association with each of the jacket heating conductor elements. A plurality of heat transfer elements built separately from one another may also be provided on one or more jacket heating conductor elements following one another in the longitudinal direction thereof. In another alternative embodiment, a heat transfer element may be configured with a different positioning of heat transfer element sections located directly adjacent to one another over the length of said heat transfer element, so that these heat transfer element sections may be located, for example, parallel to one another in some areas and they may form V-shaped structures with one another in other areas.

While specific embodiments of the invention have been shown and described in detail to illustrate the application of the principles of the invention, it will be understood that the invention may be embodied otherwise without departing from such principles.

What is claimed is:

1. An exhaust gas heating unit for an exhaust system of an internal combustion engine, the exhaust gas heating unit comprising:
    a jacket heating conductor element comprising a jacket, insulating material and an electrical heating conductor extending in the jacket and enclosed by the insulating material; and
    a heat transfer surface formation arranged on an outer side of the jacket of the jacket heating conductor element and in heat transfer contact with the jacket of the jacket heating conductor element, the heat transfer surface formation comprising a heat transfer element with a meandering extent along the jacket heating conductor element having a plurality of heat transfer element sections, which transition from one heat transfer element section into another heat transfer element sections in bent areas and with the heat transfer element sections arranged following one another in a longitudinal direction of the jacket heating conductor element, wherein each of the heat transfer element sections has a passage opening, through which the jacket heating conductor element passes.

2. An exhaust gas heating unit in accordance with claim 1, wherein:
    the jacket is comprised of metallic material; or
    the heat transfer surface formation is connected to the jacket by frictional engagement; or
    the heat transfer surface formation is connected to the jacket by connection in substance; or
    any combination of the jacket is comprised of metallic material, and the heat transfer surface formation is connected to the jacket by frictional engagement, and the heat transfer surface formation is connected to the jacket by connection in substance.

3. An exhaust gas heating unit in accordance with claim 1, wherein:
    the jacket heating conductor element is configured with a linear extent in at least some areas; or
    the jacket heating conductor element is configured with a helical extent in at least some areas; or
    the jacket heating conductor element is configured with a spiral extent in at least some areas; or
    the jacket heating conductor element is configured with a meandering extent in at least some areas; or
    any combination of the jacket heating conductor element is configured with a linear extent in at least some areas, and the jacket heating conductor element is configured with a helical extent in at least some areas, and the jacket heating conductor element is configured with a spiral extent in at least some areas, and the jacket heating conductor element is configured with a meandering extent in at least some areas.

4. An exhaust gas heating unit in accordance with claim 1, wherein:
    at least some of the heat transfer element sections are arranged essentially parallel in relation to one another; or
    at least some of the heat transfer element sections are arranged essentially at right angles in relation to the longitudinal direction of the jacket heating conductor element; or
    at least some of the heat transfer element sections are arranged essentially parallel in relation to one another and at least some of the heat transfer element sections are arranged essentially at right angles in relation to the longitudinal direction of the jacket heating conductor element.

5. An exhaust gas heating unit in accordance with claim 1, wherein at least some of the heat transfer element sections are bent at an angle different from 90° in relation to the longitudinal direction of the jacket heating conductor element.

6. An exhaust gas heating unit in accordance with claim 5, wherein:
    at least two of the heat transfer element sections that are directly adjacent to one another in the longitudinal direction of the jacket heating conductor element are arranged with a V-shaped configuration in relation to one another; or
    at least one of the heat transfer element sections is arranged essentially parallel to one of the heat transfer element sections following in the longitudinal direction of the jacket heating conductor element; or
    at least two of the heat transfer element sections that are directly adjacent to one another in the longitudinal direction of the jacket heating conductor element are arranged with a V-shaped configuration in relation to one another and at least one of the heat transfer element sections is arranged essentially parallel to one of the heat transfer element sections following in the longitudinal direction of the jacket heating conductor element.

7. An exhaust gas heating unit in accordance with claim 1, wherein at least one of the heat transfer element sections is arranged essentially parallel to a heat transfer element section directly adjacent on a first side thereof in the longitudinal direction of the jacket heating conductor element, and is configured with a V-shape with one of the heat transfer element sections located directly adjacent on a second side thereof located opposite the first side in the longitudinal direction of the jacket heating conductor element.

8. An exhaust gas heating unit in accordance with claim 1, wherein at least one of the heat transfer element sections comprises a collar, which encloses the passage opening, the collar projecting from the at least one of the heat transfer element sections and being in contact with the jacket heating conductor element.

9. An exhaust gas heating unit in accordance with claim 1, wherein:
at least some of the heat transfer element sections, between the bent areas defining same, have a same length of extension; or
at least some of the heat transfer element sections are essentially unbent; or
at least some of the heat transfer element sections, between the bent areas defining same, have a same length of extension, and at least some of the heat transfer element sections are essentially unbent.

10. An exhaust gas heating unit in accordance with claim 1, wherein the heat transfer element is comprised of an aluminum material.

11. An exhaust gas heating unit in accordance with claim 1, wherein a heat transfer surface of the heat transfer surface formation comprises catalytically active material in at least some areas.

12. An exhaust gas heating unit in accordance with claim 11, wherein the catalytically active material comprises:
platinum; or
palladium; or
rhodium; or
any combination of platinum, and palladium, and rhodium.

13. An exhaust gas heating unit in accordance with claim 11, wherein the catalytically active material comprises:
iron zeolite material; or
copper zeolite material; or
vanadium oxide material; or
any combination of iron zeolite material, and copper zeolite material, and vanadium oxide material.

14. A process for manufacturing an exhaust gas heating unit comprising a jacket heating conductor element comprising a jacket, insulating material and an electrical heating conductor extending in the jacket and enclosed by the insulating material, and a heat transfer surface formation arranged on an outer side of the jacket of the jacket heating conductor element and in heat transfer contact with the jacket of the jacket heating conductor element, the heat transfer surface formation comprising a heat transfer element with a meandering extent along the jacket heating conductor element having a plurality of heat transfer element sections, which transition from one heat transfer element section into another heat transfer element sections in bent areas with the heat transfer element sections arranged following one another in a longitudinal direction of the jacket heating conductor element, wherein each of the heat transfer element sections has a passage opening, through which the jacket heating conductor element passes, the process comprising the steps of:
providing a strip-like blank for the heat transfer element;
alternatingly bending the strip-like blank in mutually opposite bending directions to provide the bent areas at spaced locations from one another in the longitudinal direction of the strip-like blank and to provide the heat transfer element sections extending between the bent areas;
preparing a plurality of the passage openings following one another in the longitudinal direction of the strip-like blank before, after or during said step of alternatingly bending the strip-like blank; and
subsequent to said step of preparing a plurality of the passage openings, inserting the jacket heating conductor element into the passage openings arranged aligned with one another.

15. A process for manufacturing an exhaust gas heating unit in accordance with claim 14, wherein:
at least one of the heat transfer element sections comprises a collar, which encloses the passage opening, the collar projecting from the at least one of the heat transfer element sections and being in contact with the jacket heating conductor element; and
the collar enclosing the passage opening is formed in said step of preparing a plurality of the passage openings in association with the at least one passage opening.

16. A process for manufacturing an exhaust gas heating unit in accordance with claim 15, wherein in said step of preparing a plurality of the passage openings, passage openings following one another directly in the longitudinal direction of the strip-like blank, collars for each of the openings are formed in a projecting form on mutually opposite sides of the strip-like blank.

17. A process for manufacturing an exhaust gas heating unit in accordance with claim 14, wherein before or during said step of inserting the jacket heating conductor element into the passage openings, the heat transfer element sections are held, overlapping one another, at a mutual jacket heating conductor element insertion distance in relation to one another, so that the passage openings are oriented towards one another, after which the jacket heating conductor element is passed through the passage openings, and the heat transfer element sections are released and assume a mutual distance in relation to one another, which is greater than a jacket heating conductor element insertion distance.

18. An exhaust system for an internal combustion engine, comprising:
an exhaust gas flow duct; and
an exhaust gas heating unit arranged in the exhaust gas flow duct, the exhaust gas heating unit comprising a jacket heating conductor element comprising a jacket, insulating material and an electrical heating conductor extending in the jacket and enclosed by the insulating material, and a heat transfer surface formation arranged on an outer side of the jacket of the jacket heating conductor element and in heat transfer contact with the jacket of the jacket heating conductor element, the heat transfer surface formation comprising a heat transfer element with a meandering extent along the jacket heating conductor element having a plurality of heat transfer element sections, which transition from one heat transfer element section into another heat transfer element sections in bent areas with the heat transfer element sections arranged following one another in a longitudinal direction of the jacket heating conductor element, wherein each of the heat transfer element sections has a passage opening, through which the jacket heating conductor element passes.

19. An exhaust system in accordance with claim 18, further comprising an exhaust gas treatment unit comprising a catalytic converter unit or a particle filter unit or both a catalytic converter unit and a particle filter unit wherein the exhaust gas heating unit is arranged in an exhaust gas flow direction in the exhaust gas flow duct upstream in relation to the exhaust gas treatment unit.

20. An exhaust system in accordance with claim 18, wherein:
   a heat transfer surface of the heat transfer surface formation comprises catalytically active material in at least some areas; and
   the catalytically active material and the catalytic converter unit are associated with a same type of catalytic converter.

21. An exhaust system in accordance with claim 18, further comprising a hydrocarbon release device associated with the exhaust gas heating unit for releasing hydrocarbon into the exhaust gas stream upstream in relation to the exhaust gas heating unit.

22. An exhaust system in accordance with claim 18, wherein the exhaust gas heating unit is manufactured by a process comprising the steps of:
   providing a strip-like blank for the heat transfer element;
   alternatingly bending the strip-like blank in mutually opposite bending directions to provide the bent areas at spaced locations from one another in the longitudinal direction of the strip-like blank and to provide the heat transfer element sections extending between the bent areas;
   preparing a plurality of the passage openings following one another in the longitudinal direction of the strip-like blank before, after or during said step of alternatingly bending the strip-like blank; and
   subsequent to said step of preparing a plurality of the passage openings, inserting the jacket heating conductor element into the passage openings arranged aligned with one another.

* * * * *